Aug. 3, 1954     H. GOLD ET AL     2,685,294
WIDE RANGE FLOW RATE METERING VALVE
Filed April 11, 1949
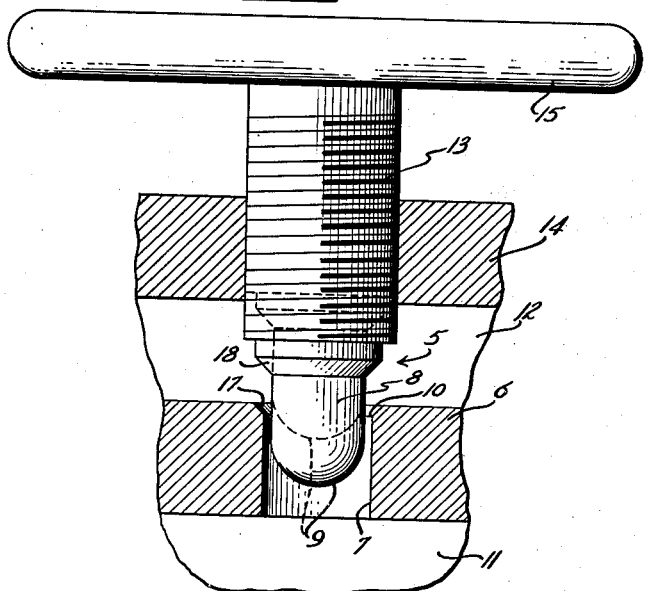
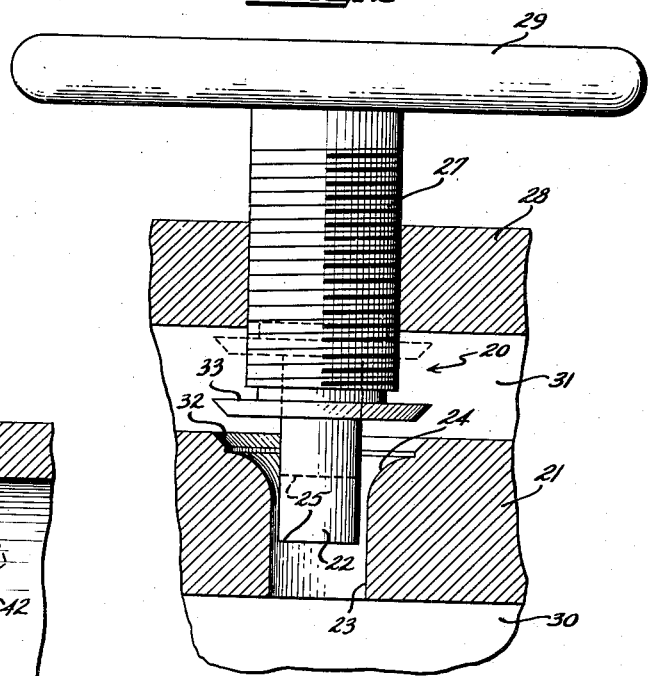
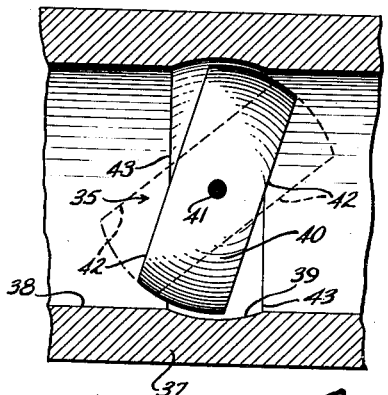
Inventors
HAROLD GOLD
DAVID M. STRAIGHT Patented Aug. 3, 1954

2,685,294

UNITED STATES PATENT OFFICE 2,685,294

WIDE RANGE FLOW RATE METERING VALVE

Harold Gold, Cleveland, and David M. Straight, Lakewood, Ohio

Application April 11, 1949, Serial No. 86,778

10 Claims. (Cl. 137—1)

The present invention relates to improvements in fluid metering valves and more particularly concerns improvements in valves of this type capable of regulating fluid flow with substantially constant sensitivity over wide ranges of flow rate.

Heretofore it has been necessary to provide in any given fluid flow system involving a wide range of flow rates, separate valves for respectively controlling low and high flow rates.

The principal object of the present invention is to provide an improved fluid flow metering valve construction wherein a single valve member is capable of controlling both low and high flow rates throughout an unusually wide range.

Another object of the invention is to provide a flow metering valve construction which is quite simple and economical to produce and assemble.

A further object of the invention is to provide a flow metering valve structure with which highly accurate wide range fluid flow metering is accomplished but in which the manufacturing tolerances are unusually liberal.

Still another object of the invention is to provide fluid flow metering means embodying in a single unit structure for varying the length of flow path for a substantail range of low flow rates and for varying the cross-sectional area of the flow path for variably controlling high flow rates.

Still another object of the invention is to provide a wide range fluid flow controlling valve construction which is adaptable for various requirements while yet maintaining equal simplicity in any particular installation.

Other objects, features and advantages of the present invention will be readily apparent from the following detailed description of certain preferred embodiments taken in conjunction with the accompanying drawings, in which:

Figure 1 is a more or less schematic sectional detail view through one form of metering valve assembly embodying features of the present invention;

Figure 2 is a sectional detail view of a modified form of the metering valve assembly; and Figure 3 is a sectional detail view of a further modification.

A flow metering valve according to the present invention comprises two relatively movable members defining therebetween a fluid flow path which is variable as to flow rate from a predetermined minimum flow rate by minute increments to and through a substantial range of high flow rate.

In one form of fluid flow metering valve structure embodying features of the invention, as shown in Figure 1, a flow controlling valve member 5 is cooperative with a flow passage member 6 having a fluid flow passage 7 therethrough.

For low flow rate control the valve member 5 and the flow passage member 6 cooperate on the principle of selectively varying the length of the flow path between the control members. To this end the flow passage 7 is cylindrical and the valve member 5 has a cylindrical portion 8 of substantial length and predetermined smaller diameter than the cylindrical flow passage 7 and disposed concentric within the flow passage. When the cylindrical portion 8 of the valve member is fully extended into the flow passage 7 minimum low flow rate of fluid through the annular clearance between the control members is permitted, assuming, of course, that the opposite ends of the flow passage 7 are unobstructed for fluid passage. Minimum flow rate is thus established in any particular installation by the calculated total cross-sectional flow area afforded by the cylindrical clearance between the control members and the flow resistance length of the cylindrical flow path. As the control members are incrementally relatively separated to reduce the length of the flow path therebetween resistance to flow is proportionately reduced and the flow rate increased. Throughout this low flow rate adjustment, of course, the total cross-sectional flow area is not altered, but only the length of the flow path and thus the resistance to flow, and as a result a range of low flow rates is attained.

Means are provided for a smooth, uniformly incremental transition from low flow rate to high flow rate throughout a substantial range. To this end, the tip of the valve member 5 within the bore or flow passage 7 is gradually reduced to a point, an advantageous structure comprising substantially semi-spherical rounding thereof, as indicated at 9. Hence, when the control members are relatively separated to the extent that the cylindrical portion 8 of the valve member leaves the cylindrical passage 7 by movement beyond a terminal edge 10 of the cylindrical passage 7, the cross-sectional flow area between the members increases incrementally to the extent that the rounded control nose 9 of the valve member is withdrawn from the passage 7. The extent of this incremental increase in cross-sectional flow area, and thus increase in flow rate, can be predetermined by the shape of the high flow rate control nose 9.

In order to match the variable-length and variable-area components to obtain substantially constant and equal sensitivity over the full range of operation of the valve, it is necessary that the two components operate according to the same relation. The diameter of the passage is determined by the flow rate desired at the maximum opening of the valve. A straight plunger is then selected to fit with a known clearance in the passage. This combination is then calibrated at various lengths of engagement at given fluid pressure differential. The data thus obtained are then plotted on semilogarithmic coordinates such that the flow rate is plotted along the logarithmic axis and the length of engagement is plotted along the linear axis. A straight line is then fitted to the data plot and extended beyond the point of zero engagement. The contour of the end of the plunger is then designed to vary the flow area such that the extended straight line is adhered to. It should be understood that only a reasonably close agreement with the straight line is necessary to secure a valve of very desirable characteristics.

Either the valve member 5 or the flow passage member 6 may be movable or both of the members may be movable in operation, but in a simple and practical form the valve member 5 is movably mounted, the passage member 6 being stationary. In such an arrangement the passage member 6 may comprise a separating wall or partition between a fluid passageway or container or duct 11, and a fluid flow space 12, or the fluid flow spaces 11 and 12 may be parts of a conduit or duct divided by the control member 6 with all fluid flow compelled to pass through the passage 7. In such an arrangement the valve member 5 may include a threaded stem 13 threadedly operative through a wall 14 and having the control valve portions 8 and 9 on its inner end while the outer end carries actuating means such as a hand wheel 15. By proper correlation of the pitch of the threads on the valve stem 13 with the control means of the valve for proper incremental axial shifting of the valve a wide range of adjustments can be accurately predicted with relation to the turns of the valve member as effected by the hand wheel 15.

In order to have the fluid control assembly function further as a fluid shut-off, the passaged control member 6 is provided with a diagonal valve seat 17 outwardly of the passage edge 10 cooperative with a closure valve shoulder 18 at the stem extremity of the cylindrical control valve portion 8. Thus, when the valve is turned down to engage the valve shoulder 18 against the valve seat 17, a fluid seal is effected shutting off fluid flow through the passage 7.

It will thus be apparent that the control valve 5 serves in cooperation with the passaged control member 6 to control fluid flow between the fluid flow spaces 11 and 12, in either direction as preferred through the passage 7, from zero flow to a high flow rate, and this can be effected by minute increments. Thus, when the valve is fully closed fluid flow is entirely blocked. When the valve shoulder 18 is separated from the valve seat 17, low rate flow is established in the cylindrical flow-controlling space between the cylindrical valve portion 8 and the wall of the flow passage or bore 7. As the cylindrical valve portion 8 is withdrawn incrementally from the bore 7 there is a proportionate percentage increase in flow rate throughout the remainder of the low flow rate range until the receding or diminished flow rate control tip 9 of the valve is incrementally withdrawn past the passage terminus 10 for equal percentage high flow rate control. The full line position shown in Figure 1 discloses the cylindrical portion 8 as approximately half withdrawn from the bore 7, while the dash line position of the valve member discloses the control tip 9 withdrawn approximately half-way from the passage terminus 10.

In a control valve assembly according to Figure 1 on which flow control readings were recorded, flow control with substantially constant sensitivity was obtained over a range of flow rates of 800 to 1. The minimum recorded flow rate was 4 pounds per hour and the maximum flow rate was 3200 pounds per hour. This was accomplished in a bore of 0.25 inch, with a liquid having a specific gravity of 0.8 and with a pressure differential across the valve of 78 pounds per square inch. The diametral clearance between the cylindrical plunger portion of the valve and the wall of the passage bore was 0.001 inch. The valve was so proportioned that equal percentage changes in flow rate were attained with equal increments of valve movement.

In the form of the invention shown in Figure 2 substantially the same functional relationships between a valve member 20 and a fluid passage member 21 are provided for as in the fluid control assembly of Figure 1, in that there is afforded a combination of variable length of flow path and variable-port area for constant sensitivity fluid flow control from low flow rate to high flow rate, but a slightly different disposition of the means for accomplishing these results is provided. The valve member 20 comprises as the principal control means a cylindrical plunger portion 22 of predetermined smaller diameter than a fluid passage bore 23 through the control member 21 and which throughout its major extent is cylindrical so as to provide in combination with the cylindrical valve plunger portion 22 a low flow rate annular passage of incrementally variable length by relative axial movement of the control members.

For high flow rate control the end portion of the passage or bore 23 through which the valve plunger projects is formed with a curved surface of revolution 24 the curve of which is properly selected and proportioned with respect to the cylindrical valve plunger portion 22 so that as a truncated terminal edge 25 of the plunger leaves the cylindrical portion of passage 23 incremental equal percentage high flow rate variation can be effected. In the full line showing the plunger 22 is indicated as partially withdrawn from the cylindrical portion of the passage 23, while the dash line position of the plunger indicates partial functional withdrawal thereof from the flaring high flow rate control portion or section 24 of the flow passage.

Similarly as in the previously described form of the invention, the valve member 20 includes a stem 27 which is threaded and operatively threads through a wall 28, having the cylindrical valve plunger 22 at its inner end and an operating hand wheel or the like 29 at its outer end. The control member 21 may be a wall or partition separating fluid flow spaces 30 and 31 between which the rate of flow of the fluid is to be controlled.

Full shut-off of fluid is provided for by the provision of a tapered valve seat 32 at the outer ends of the flaring high flow rate control portion 24 of the fluid passage and a complementary shoulder valve flange 33 at the base end of the cylindrical plunger portion 22.

In Figure 3 is shown a control assembly operating on the same principle as the plunger type control valves of Figures 1 and 2 but adapted for flow rate control through a passage within a duct or pipe. To this end the control device includes a butterfly-type valve member 35 and a cooperating flow passage member 37. In the present instance the member 37 is of tubular structure or at least has a cylindrical bore 38 providing a fluid passage. The wall of the fluid passage is formed with an annular spherical segment groove 39, and the periphery of the valve member 35 is of complementary spherical segmental shape providing a control surface 40 of a predetermined shorter radius than the spherical segmental surface of the groove 39 so as to provide a predetermined small flow path clearance uniformly between the valve member and the groove 39 when the valve member is in full peripheral registration with the groove. The length of the flow path between the valve member 35 and the wall of the groove 39 is determined by the thickness of the valve member 35 or at least the width of the spherical segmental surface 40, and the angular relationship of the valve 35 to the spherical segmental surface defining the groove 39.

The valve member 35 is pivotally mounted on its spherical axis through the control surface 40 by journal or trunnion means 41 engaging within appropriate bearings (not shown) in the wall of the passage member 37 defining the groove 39, appropriate means (not shown) being secured or connected to or with one of the trunnions or journals to effect swinging of the valve member 35 about the axis defined by the journals.

As the valve member 35 is swung out of full registration with the groove 39, as indicated in full line in Figure 3, the length of the flow path between the groove 39 and the segmental spherical surface 40 is shortened and the flow rate proportionately increased. In this manner low flow rate control is attained from a minimum rate wherein the valve member is in full registration with the groove 39 to the point where opposite truncated edges 42 on the valve member lie directly opposite respective groove side edges 43. Up to this point the cross-sectional flow area of the flow path remains the same with merely a shortening of the length of the flow path. As the valve member 35 is swung to carry the respective trailing portion of the edges 42 thereof beyond the groove edges 43 into the passage 38 the port area is proportionately increased with a corresponding increase in the flow rate, depending upon the distance to which the trailing edge portions 42 and the groove edges are separated. It will therefore be apparent that this butterfly valve arrangement affords a combination of variable length of flow path and variable port area functioning like the previously described reciprocal valve arrangement for controlling flow rates with substantially constant sensitivity throughout a wide range of low flow rate and high flow rate.

From the foregoing it will be apparent that a wide range of fluid flow control from a very low flow rate to a high flow rate is attainable through the use of a control assembly according to the present invention involving merely a pair of relatively movable members which combine the dual functions of low and high flow rate control. By proper proportioning of the two fluid-flow control means of the assembly, namely the means for low flow rate control by varying the length of flow path and the means for controlling high flow rate by varying the cross-sectional or orifice area of the flow path, equal increments of motion of the control means results in equal percentage changes in resistance to flow and thereby equal percentage changes in the affected flow rates. Moreover, these desirable results are attained with mechanism in which larger clearances and larger manufacturing tolerances are permissible than in prior devices and without affecting the substantial accuracy of results of the unit. Instead of requiring a plurality of different specialized valve assemblies for low flow rate control and for high flow rate control, the present invention provides for both functions throughout a wide range in one unit.

We claim as our invention:

1. In combination in a fluid flow rate controlling assembly, a member defining a fluid flow passage, and a flow restricting member in said passage and movable relative to the passage member, said restricting member and said passage member including opposing first portions cooperative throughout a predetermined section of the passage to define therebetween a flow path of uniform cross-sectional flow area throughout the length of said section but variable as to length by shifting of the restricting member in the passage, and said members including second portions thereof cooperative in another section of the flow path in sequence after said restricting member has moved entirely beyond the first mentioned section of the passage into the succeeding section, one of said second portions being curved in the direction of movement of the members and the other of said second portions being in receding relation to said one of said second portions to define a flow path of variable cross-sectional area in which the restricting member is movable in a predetermined range beyond said first mentioned section.

2. In combination in a fluid flow rate controlling assembly, a member defining a fluid flow passage, and a flow restricting member in said passage and movable relative to the passage member, said restricting member and said passage member including opposing portions cooperative throughout a predetermined section of the passage to define therebetween a flow path of uniform cross-sectional flow area throughout the length of said section but variable as to length by shifting of the restricting member in the passage, and said members including portions thereof cooperative in another section of the passage in sequence after said restricting member has moved entirely beyond the first mentioned section of the passage into the succeeding section to define a flow path of variable cross-sectional area, one of said members having one of the cooperative portions thereof annular in form and convexly curved transversely to the annulus and operatively opposing the cooperative portion of the other of said members, said cooperative portions of the members being so proportioned and constructed that equal increments of motion of said restricting member results in equal percentage changes in resistance to flow throughout both of said flow paths in succession and thereby equal percentage changes in the affected flow rates in said successive flow paths in sequence.

3. In combination in a fluid flow controlling assembly, means defining a fluid flow path, and a flow restricting member located in said path and including a portion movable throughout a substantial length of said flow path to vary the length of the flow path while maintaining the cross-sectional flow area thereof constant, said member being movable beyond said length of the flow path and then cooperating with the flow path member to define a successive length of flow path variable as to cross-sectional flow area in the continued onward movement of the restricting member, said restricting member comprising a reciprocable plunger having a cylindrical portion cooperative with the first mentioned length of the flow path and a curvate portion having the generating curve of the surface of revolution thereof tangent to said cylindrical portion and cooperative with the second mentioned length of flow path.

4. In combination in fluid flow controlling means of the character described, a member defining a cylindrical fluid flow passage, a reciprocable valve plunger including a cylindrical portion of smaller diameter than said passage and defining with said passage an annular restricted flow path of predetermined length variable as to length by axial movement of the valve plunger, the terminus of the valve plunger being curvate and cooperating in the retraction of the plunger beyond an end of the passage with such end of the passage to define a flow path of incrementally varying cross-sectional area variable by reciprocable movement of the valve plunger, the curve of the surface of said terminus being angular to the axis of the plunger and sloping from tangential juncture with the outer surface of the plunger contiguous to the terminus.

5. In a fluid flow control unit, means defining a fluid passage having a terminal end portion, and means in said passage for controlling fluid flow therethrough and having a terminal end portion, said means being reciprocably relatively movable, said means including telescopingly related radially spaced cylindrical concentric parts defining therebetween a flow path of substantially constant cross-sectional flow area but variable length and variable as to length in the relative reciprocable movement of said means, one of said terminal portions being of continuously sloping rounded contour, the generating curve of the surface of revolution of which is tangent to the associated cylindrical part, and defining in cooperation with the other terminal end portion a successive flow path of variable cross-sectional flow area in the relative movement of the two means in one continuous direction and following separation of said cylindrical concentric parts at the end of said variable length flow path.

6. In combination in a fluid flow control assembly, a pair of members defining therebetween a fluid passage and being relatively movable in opposite directions throughout an operative range, said members having opposing surfaces of substantial length defining therebetween a low flow rate passage section of variable length but uniform cross sectional flow area throughout a portion of said range of relative movement of the members, one of said members having an edge defining one end of its opposing surface, and the opposing surface of the other of said members having a portion curving in the direction of relative movement of the members and cooperative with said edge upon relative movement of the members beyond said low flow rate passage section to define a high flow rate passage section of variable cross sectional area.

7. A method of controlling fluid flow uniformly through a passage having in sequence relation a low flow rate first portion and a high flow rate second portion, with substantially constant sensitivity in uniform sequential increments over a range of flow rates of about 800 to 1: comprising varying by equal percentage changes the flow rate within a low flow rate component of said range by varying by equal increments the length of the flow path through said first portion of the passage while maintaining the total cross-sectional flow area of said first portion constant to an unrestricted point substantially coincident with the minimum flow area point of said second passage portion; varying by equal percentage changes, conforming to the percentage changes in the low flow rate component, the flow rate within a high flow rate component of the range by varying by equal increments the cross-sectional flow area in said second portion of the passage, and effecting a gradual uninterrupted sequential flow rate transition between the highest flow of the low flow rate component and the lowest flow of the high flow rate component integrated with the equal percentage changes of the flow rate variations in said components.

8. A method of controlling fluid flow through a passage by substantially uniform sequential percentage increments throughout a full range in a flow path including respective low and high flow rate components disposed in sequence, which comprises varying the low flow rate by varying the length of the low flow rate component by uniform increments while maintaining the total cross-sectional flow area thereof constant to a terminal unrestricted point substantially coincident with the minimum area point of the high flow rate component, effecting a gradual uninterrupted and integrated sequential flow rate transition across said points between the highest flow rate in the low flow rate component and the lowest flow rate in the high flow rate component, and in the high flow rate component varying the flow rate by varying by uniform increments the cross-sectional flow area thereof.

9. An assembly according to claim 2, wherein said one member defines a cylindrical passage having at one end thereof said annular convexly curved portion, and said other member is a cylindrical truncated terminal plunger of predetermined smaller diameter than the cylindrical portion of said one member and is reciprocably movable concentrically within said cylindrical and annular portions of said one member.

10. A fluid flow controlling assembly as defined in claim 2, wherein said one member comprises a butterfly valve of substantial thickness with the edge thereof providing the convexly curved annulus, and the other member comprises a tubular structure the portion whereof that operatively opposes said annulus being an annular groove complementary in curvature to and spaced from said annulus and within which the valve is mounted for swinging movement about a central diametrical axis.

References Cited in the file of this patent

UNITED STATES PATENTS

| Number | Name | Date |
|---|---|---|
| 697,093 | Larkin | Apr. 8, 1902 |
| 850,622 | Clark | Apr. 16, 1907 |
| 1,401,468 | Fitts | Dec. 27, 1921 |
| 1,680,936 | Culp | Aug. 14, 1928 |
| 1,768,582 | Dougherty | July 1, 1930 |
| 2,106,300 | Harrison | Jan. 25, 1938 |
| 2,388,457 | Ziegler | Nov. 6, 1945 |
| 2,541,176 | Rockwell | Feb. 13, 1951 |

FOREIGN PATENTS

| Number | Country | Date |
|---|---|---|
| 155,290 | Switzerland | 1932 |
| 443,212 | Germany | 1927 |
| 493,909 | Germany | 1930 |